US012706395B2

(12) United States Patent
Wilkins et al.

(10) Patent No.: US 12,706,395 B2
(45) Date of Patent: Aug. 11, 2026

(54) ANTENNA ARRAY ASSEMBLY

(71) Applicant: Cambium Networks Ltd, Ashburton (GB)

(72) Inventors: Adam Wilkins, Ashburton (GB); Paul Clark, Ashburton (GB); Nigel King, Ashburton (GB)

(73) Assignee: Cambium Networks Ltd, Ashburton (GB)

( * ) Notice: Subject to any disclaimer, the term of this patent is extended or adjusted under 35 U.S.C. 154(b) by 27 days.

(21) Appl. No.: 18/827,064

(22) Filed: Sep. 6, 2024

(65) Prior Publication Data

US 2024/0429625 A1 Dec. 26, 2024

Related U.S. Application Data

(63) Continuation of application No. PCT/EP2023/055800, filed on Mar. 7, 2023.

(30) Foreign Application Priority Data

Mar. 8, 2022 (GB) ..................................... 2203222

(51) Int. Cl.
*H01Q 21/06* (2006.01)
*H01Q 1/42* (2006.01)
*H01Q 1/48* (2006.01)

(52) U.S. Cl.
CPC ............. *H01Q 21/065* (2013.01); *H01Q 1/42* (2013.01); *H01Q 1/48* (2013.01)

(58) Field of Classification Search
CPC ........... H01Q 21/065; H01Q 1/42; H01Q 1/48
See application file for complete search history.

(56) References Cited

U.S. PATENT DOCUMENTS 3,774,224 A 11/1973 Shibano et al.
11,909,121 B2 * 2/2024 Li ........................ H04B 7/0617
(Continued)

FOREIGN PATENT DOCUMENTS

EP 4 012 439 A1 6/2022
JP S4896271 12/1973
(Continued)

OTHER PUBLICATIONS

International Search Report and Written Opinion received for Application No. PCT/EP2023/055800 mailed Jun. 23, 2023 (13 pages).

*Primary Examiner* — Hai V Tran
(74) *Attorney, Agent, or Firm* — Crowell & Moring LLP

(57) ABSTRACT

An antenna array assembly comprises a ground plane, an array of patch radiator elements having a plurality of rows and a plurality of columns of patch radiator elements disposed in a plane parallel to a first face of the ground plane and a non-conductive cover disposed in a generally parallel relationship to the ground plane. The non-conductive cover has a first face, disposed towards the array of patch radiator elements, having an arrangement of alternating parallel ridges and grooves, in which, in a cross section in a plane perpendicular to the first face of the ground plane, the ridges extend towards the array of patch radiator elements and the grooves extend away from the array of patch radiator elements. Each row of patch radiator elements is disposed in a parallel relationship to each ridge.

20 Claims, 6 Drawing Sheets

(56) References Cited

U.S. PATENT DOCUMENTS

| | | | | |
|---|---|---|---|---|
| 12,119,545 | B2 * | 10/2024 | Hou | H01Q 19/185 |
| 2011/0063183 | A1 * | 3/2011 | Sanford | H01Q 21/06 343/848 |
| 2019/0097301 | A1 * | 3/2019 | Wu | H05K 5/03 |
| 2019/0363456 | A1 | 11/2019 | Chen et al. | |
| 2021/0041529 | A1 | 2/2021 | Brown et al. | |
| 2021/0305717 | A1 | 9/2021 | Hou et al. | |
| 2022/0102842 | A1 * | 3/2022 | Li | H01Q 1/42 |

FOREIGN PATENT DOCUMENTS

| | | |
|---|---|---|
| JP | 5450169 | 3/2014 |
| WO | WO 2022/066406 A1 | 3/2022 |

* cited by examiner

ANTENNA ARRAY ASSEMBLY

CROSS-REFERENCE TO RELATED APPLICATIONS

This application claims priority as a Continuation of PCT Application No. PCT/EP2023/055800, filed on Mar. 7, 2023, published as WO 2023/170098 A1, which claims priority to Great Britain Application No. 2203222.1, filed Mar. 8, 2022, the entirety of each of which are incorporated herein by reference.

TECHNICAL FIELD

The present disclosure relates generally to an antenna array assembly, and more specifically, but not exclusively, to an antenna array assembly having a non-conductive cover having an arrangement of alternating parallel ridges and grooves on at least one face.

BACKGROUND

In modern wireless systems, such as for example cellular wireless and fixed radio access wireless networks, there is a need for radio transceiver equipment in user equipment or at base stations or access points, which is economical to produce, while having high performance at radio frequencies. Increasingly high radio frequencies are being used as spectrum becomes scarce and demand for bandwidth increases. Furthermore, antenna systems are becoming increasingly sophisticated, often employing arrays of antenna elements to provide controlled beam shapes and/or MIMO (multiple input multiple output) transmission.

Typically, an array of antenna elements may be provided with a non-conductive cover, which may be referred to as a radome, to provide protection from the environment, for example to give protection from rain. It is preferable that the non-conductive cover should allow transmission of radio signals with as little change as possible to the beam shapes produced by the array of antenna elements. Signals transmitted by the array of antenna elements are typically partially reflected at each face of the non-conductive cover, due to the difference in dielectric constant between the material of the non-conductive cover and the air. Reflections from the non-conductive cover may be further reflected from a ground plane of an antenna array and may be radiated through the non-conductive cover. This can cause unwanted changes to the beam shape of a radiated or received beam formed by the array of antenna elements.

SUMMARY

In accordance with a first aspect of the present disclosure, there is provided an antenna array assembly, comprising:

a ground plane;

an array of patch radiator elements having a plurality of rows and a plurality of columns of patch radiator elements disposed in a plane parallel to a first face of the ground plane; and a non-conductive cover disposed in a generally parallel relationship to the ground plane such that the array of patch radiator elements is between the non-conductive cover and the ground plane, the non-conductive cover having a first face disposed towards the array of patch radiator elements and a second face disposed away from the array of patch radiator elements, wherein at least the first face of the non-conductive cover has an arrangement of alternating parallel ridges and grooves, in which, in a cross section in a plane perpendicular to the first face of the ground plane, the ridges extend towards the array of patch radiator elements and the grooves extend away from the array of patch radiator elements, wherein each row of patch radiator elements is disposed in a parallel relationship to each ridge.

This can reduce unwanted changes to the beam shape of a radiated or received beam formed by the array of antenna elements, typically providing a beam pattern that has a beam shape with reduced ripple.

In an embodiment, a perpendicular distance between each groove on the first face of the non-conductive cover and the array of patch radiator elements is greater by at least a quarter of a wavelength at an operating frequency of the antenna array assembly than a perpendicular distance between each ridge on the first face of the non-conductive cover and the array of patch radiator elements.

This has been found to provide reduced changes to the intended beam shape, in particular in a plane including the ridges and/or grooves.

In an embodiment, the perpendicular distance between each groove on the first face of the non-conductive cover and the array of patch radiator elements is greater, by between a quarter and a half of a wavelength in air at an operating frequency of the antenna array assembly, than a perpendicular distance between each ridge on the first face of the non-conductive cover and the array of patch radiator elements.

This has been found to provide particularly effective reduction on distortion introduced by the non-conductive cover to the beam shape formed by the array of antenna elements.

In an embodiment, the perpendicular distance between each groove on the first face of the non-conductive cover and the array of patch radiator elements is greater by between 0.3 and 0.4 wavelengths in air at an operating frequency of the antenna array assembly than a perpendicular distance between each ridge on the first face of the non-conductive cover and the array of patch radiator elements.

In an embodiment, the second face of the non-conductive cover has an arrangement of alternating parallel ridges and grooves, each ridge on the second face overlying a corresponding groove on the first face.

In an embodiment, a thickness of the non-conductive cover between each ridge of the first face and each corresponding groove of the second face is greater than half a wavelength at an operating frequency of the antenna array assembly in a dielectric material of which the non-conductive cover is composed.

This allows the non-conductive cover to have increased mechanical strength without undue distortion of a beam shape formed by the array of antenna elements.

In an embodiment, a perpendicular distance between each ridge on the first face of the non-conductive cover and the patch radiator array is between one and three wavelengths at an operating frequency of the antenna array assembly.

This allows for a compact antenna array assembly without introducing distortion of the beam shape produced by the array of antenna elements.

In an embodiment of the present disclosure, a spacing between each ridge and each adjacent groove measured in a plane parallel to the first face of the ground plane is an integer multiple of a spacing between adjacent patch radiator elements in a row of patch radiator elements, and may be the same as a spacing between adjacent patch radiator elements in a row of patch radiator elements.

This provides a reduced distortion of the beam shape produced by the array of antenna elements.

In an embodiment, each row of patch radiator elements in the array of patch radiator elements is aligned with a respective ridge or groove such that adjacent rows of patch radiator elements in the array are arranged such that one is aligned with a groove and the other is aligned with a ridge.

This has been found to provide particularly effective reduction in distortion to a beam shape produced by the array of antenna elements.

In an embodiment, the arrangement of alternating parallel ridges and grooves on at least the first face of the non-conductive cover is substantially sinusoidal in a cross section in a plane perpendicular to the first face of the ground plane. In other examples, the arrangement of alternating parallel ridges and grooves may be trapezoidal or triangular in cross-section.

In an embodiment, each column of patch radiator elements is configured to be disposed as a vertical array of elements fed by a respective feed network when in use, and each groove and each ridge is configured to be disposed horizontally when in use.

This allows a reduction of ripple, in particular in a radiation pattern in azimuth.

In an embodiment, each column of patch radiator elements is configured to be fed with a different respective signal. The antenna array assembly may have an operating frequency greater than 10 GHz, and in an example may have an operating frequency of substantially 28 GHz. The non-conductive cover may be composed of a material having a relative dielectric constant of 2-3.5, and for example may be composed of polycarbonate.

Further features and advantages of the present disclosure will be apparent from the following description of preferred embodiments, which are given by way of example only.

DETAILED DESCRIPTION

By way of example, embodiments of the present disclosure will now be described in the context of an antenna array assembly for a fixed wireless access wireless communication system operating with a carrier frequency of approximately 28 GHz, comprising a plurality of access points proving wireless coverage to a geographical area and a plurality of subscriber modules located, for example, at subscriber's premises such as residential homes or buildings. However, it will be understood that this is by way of example and that embodiments of the present disclosure are not limited to operation at this frequency and may operate at lower or higher operating frequencies and the antenna array assembly may be used in other types of wireless communication system.

Figure 1:
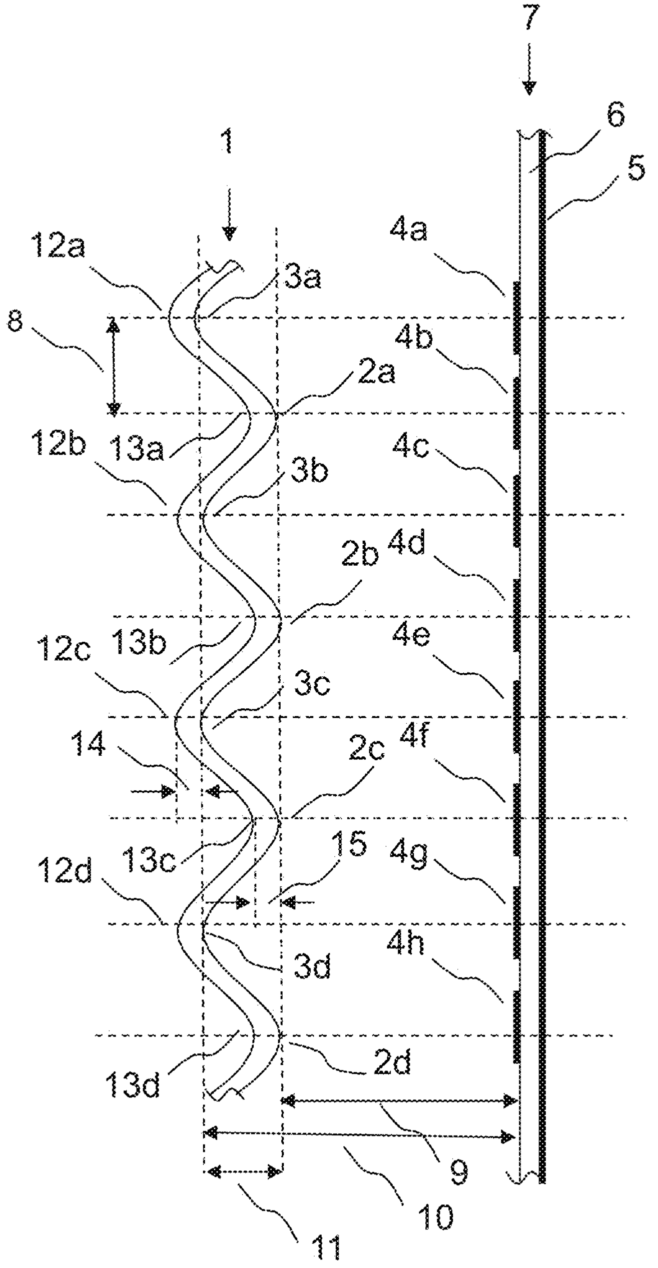
FIG. 1 is a schematic diagram showing a section through an antenna array assembly in an embodiment of the present disclosure.
Figure 2:
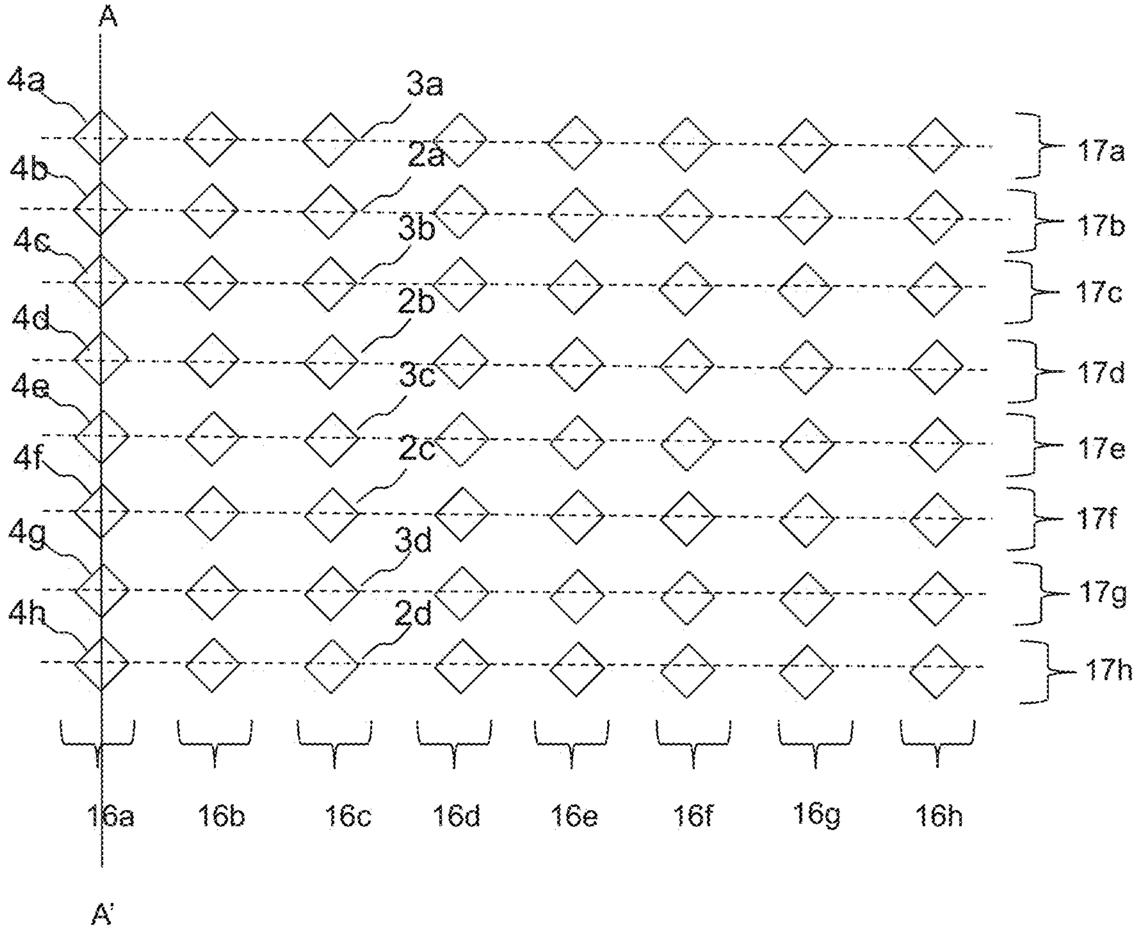
FIG. 2 is a schematic diagram showing an array of antenna elements.
Figure 3:
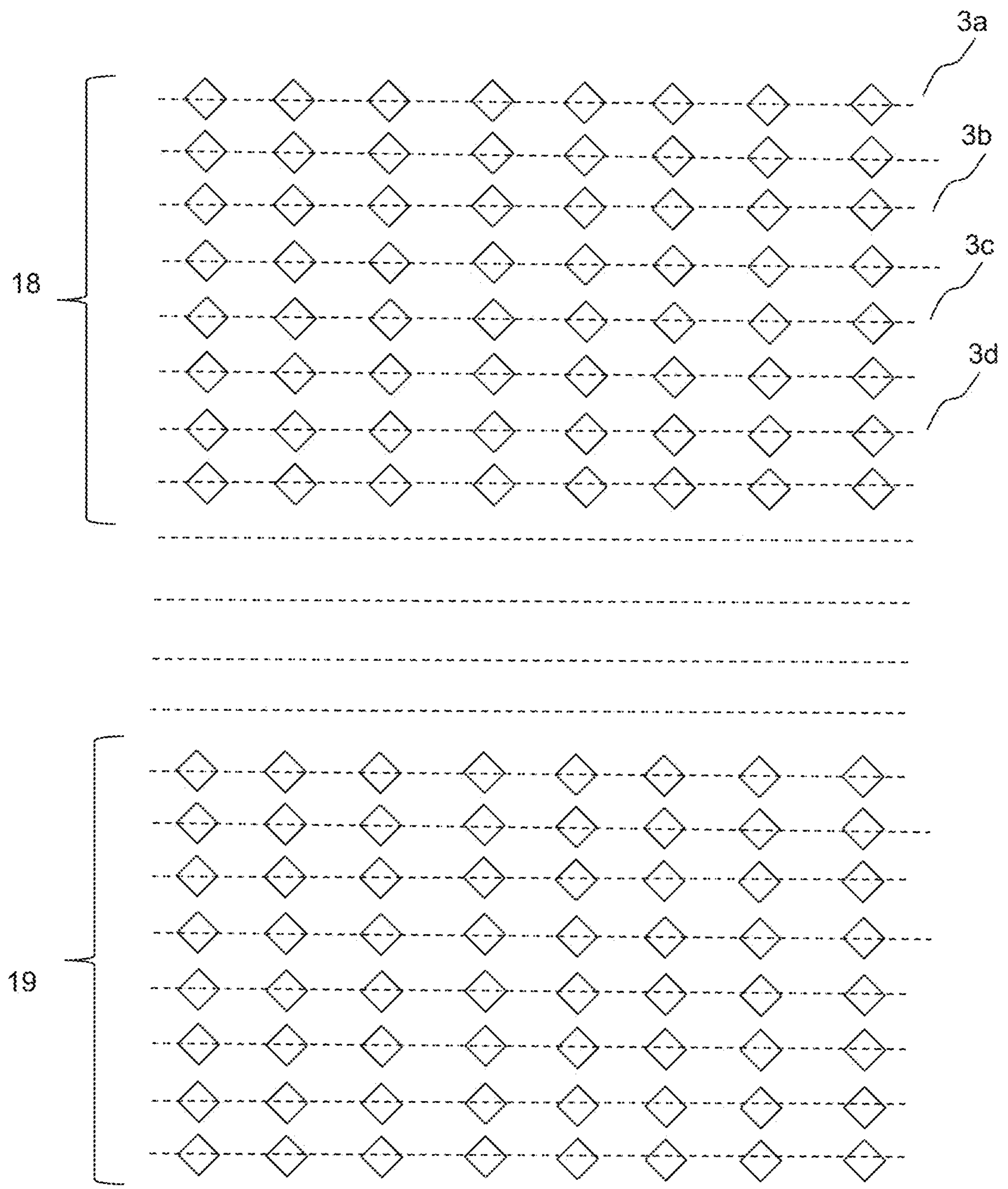
FIG. 3 is a schematic diagram showing an array of antenna elements having transmit and receive sections.

FIG. 1 is a schematic diagram showing a cross-section through an antenna array assembly in an embodiment of the present disclosure and FIGS. 2 and 3 illustrate examples of arrays of patch radiator elements in the antenna array assembly, shown as a schematic diagram in plan view. In the example of FIG. 2, an 8×8 array of patch radiator elements is shown, in which each element may be used for transmit and or receive. In the alternative example of FIG. 3, the array of patch radiator elements comprises two 8×8 sub-arrays as shown: a transmit array 18 and a receive array 19. Other arrangements and numbers of patch radiator elements may be used. Each patch radiator element in the array is typically arranged to transmit and/or receive signals with an appropriate relative phase and/or amplitude to form a desired beam.

As shown in FIG. 1, the antenna array assembly comprises a ground plane 5, an array of patch radiator elements 4*a*-4*h*, arranged in a plane parallel to a first face of the ground plane, and non-conductive cover 1. In an example, the patch radiator elements 4*a*-4*h* may be formed as printed copper patches on one side of a circuit board 7 formed of a dielectric substrate 6, with the ground plane 5 formed on the other side of the circuit board. The non-conductive cover 1 may be formed, for example, from polycarbonate or other electrically non-conductive material and may be held in place in a generally parallel relationship to the ground plane by mechanical supports such as posts or ledges, typically at the edges of the array. The non-conductive cover 1, which may be referred to as a radome, is intended to allow radio radiation to be transmitted and/or received to and/or from the array of antenna elements. The non-conductive cover 1 is typically connected to an environmentally sealed enclosure around a radio terminal, such as an access point or subscriber module, which is connected to the antenna array assembly. The enclosure may provide mechanical support to the circuit board carrying the array of patch radiator elements, and also provide fixing points for the radome, which may be fixed to the enclosure, for example, by screws around the perimeter of the non-conductive cover and outside the region of the radome through which radiation is intended to pass.

FIG. 1 shows that at least a first face of the non-conductive cover, facing the array of patch radiator elements 4*a*-4*h*, has an arrangement of alternating parallel ridges 2*a*-2*d* and grooves 3*a*-3*d*, in which, in a cross section in a plane perpendicular to the first face of the ground plane, the ridges 2*a*-2*d* extend towards the array of patch radiator elements and the grooves 3*a*-3*d* extend away from the array of patch radiator elements. In the example of FIG. 1, the non-conductive cover 1 is corrugated, having substantially sinusoidal corrugations. In an example, each corrugation is configured to be disposed horizontally, when the antenna array assembly is installed with rows of the array of the patch radiator elements disposed horizontally. In an example, the corrugations extend at least across a region of the non-conductive cover 1 overlying the array of patch radiator elements, through which radiation to and/or from the array of patch radiator elements is intended to pass. Ridges may be described as peaks of corrugations and grooves may be described as troughs of corrugations on a respective face of the non-conductive cover.

As shown by FIG. 2, the array of patch radiator elements is arranged as columns 16*a*-16*h* and rows 17*a*-17*h*. Typically, the rows are disposed horizontally and the columns are disposed vertically when the antenna array assembly is installed, for example on an antenna tower or fixed to a building, however, the orientation may vary according to the installation. A to A' in FIG. 2 shows the line through which the cross-section of FIG. 1 is taken, so that the patch elements 4*a*-4*h* form column 16*a*. FIG. 2 shows the position of the grooves 3*a*-3*d* and ridges 2*a*-2*d* of the non-conductive cover 1 in relation to the patch radiator elements, in this example, in plan view, viewed perpendicular to the ground plane. It can be seen that each row of patch radiator elements 17*a*-17*h* is disposed in a parallel relationship to each ridge 2*a*-2*d* in the non-conductive cover 1. In this example, it can be seen that the rows and ridges are horizontally disposed. Similarly, each row of patch radiator elements 17*a*-17*h* is disposed in a parallel relationship to each groove 3*a*-3*d*. Each column 16*a*-16*h* of patch radiator elements is disposed at a right angle to each ridge 2*a*-2*d* and each groove 3*a*-3*d* of the non-conductive cover.

The patch radiator elements shown in the example of FIG. 2 are formed as squares of copper, each arranged to transmit and/or receive at polarisations of +/−45 degrees. Each patch may be connected to a radio frequency transmit and/or receive chain, for example, by a microstrip track connected to an edge of the patch radiator element. Orthogonal polarisations, such as the +/−45 degree polarisations, may be excited by connecting radio signals to adjacent edges of each patch radiator element. Other orientation and shapes of patch radiator elements may be used, for example the patch radiator elements may be disposed to excite vertical and horizontal polarisations, rather than +/−45 degrees, and the patch radiator elements may be other shapes, such as rectangular or circular. In alternative examples, the patch radiator elements may be connected to a transmitter and/or receiver circuit by probes or plated through holes through the printed circuit board, or by electromagnetic coupling through a slot in the ground plane below each patch radiator element, or by any other well-known technique.

Returning to FIG. 1 a perpendicular distance 10 between each groove 3*a*-3*d* on the first face of the non-conductive cover 1 and the array of patch radiator elements 4*a*-4*h* may be greater by at least a quarter of a wavelength at an operating frequency of the antenna array assembly than a perpendicular distance 9 between each ridge 2*a*-2*d* on the first face of the non-conductive cover and the array of patch radiator elements 4*a*-4*h*. It has been found that this arrangement reduces the amount or ripple introduced into the radiation pattern by the non-conductive cover, that is to say by the radome. In particular, ripple, that is to say unwanted variation in amplitude and/or phase, is reduced in the azimuth plane, when the rows are disposed horizontally. It is thought that this arrangement mitigates the effects of reflections from the non-reflective cover 1 which may be re-radiated from the ground plane 5, causing destructive and constructive interference with directly radiated signals. The difference of path lengths of the various reflection paths from the ridges and grooves to the ground plane seems to cumulatively reduce peaks and troughs of the destructive and constructive interference with directly radiated signals, particularly in the azimuth pattern, that is to say the radiation beam pattern in the horizontal plane.

The difference between the perpendicular distance 10 between each groove 3*a*-3*d* on the first face of the non-conductive cover 1 and the array of patch radiator elements 4*a*-4*h* and the perpendicular distance 9 between each ridge 2*a*-2*d* on the first face of the non-conductive cover and the array of patch radiator elements 4*a*-4*h* may be referred to as the peak-to-peak hight difference 11 between the ridges and groves. It has been found that particularly good performance in terms of reduction in pattern ripple may be achieved with a peak-to-peak hight difference 11 between the ridges and groves of between a quarter and a half of a wavelength in air at an operating frequency of the antenna array assembly, and in an example a peak-to-peak hight difference 11 between the ridges and groves of between 0.3 and 0.4 wavelengths in air at an operating frequency of the antenna array has been found to be particularly effective.

In an example, the perpendicular distance 9 between each ridge 2*a*-2*d* on the first face of the non-conductive cover and the patch radiator array 4*a*-4*h* is between one and three wavelengths at an operating frequency of the antenna array assembly. This allows for a compact antenna array assembly without introducing distortion of the beam shape produced by the array of antenna elements. In other examples, the distance 9 may be greater, for example up to 10 wavelengths or greater.

As shown in FIG. 1, both faces of the non-conductive cover may have ridges and grooves, so that the second face of the non-conductive cover has an arrangement of alternating parallel ridges 12*a*-12*d* and grooves 13*a*-13*d*, each ridge on the second face overlying a corresponding groove on the first face. The thickness 15 of the non-conductive cover between each ridge 2*a*-2*d* of the first face and each corresponding groove 13*a*-13*d* of the second face may be greater than half a wavelength at an operating frequency of the antenna array assembly in a dielectric material of which the non-conductive cover is composed. The thickness of the non-conductive cover may be the same throughout the area of the non-conductive cover overlying the array of patch radiator elements. The thickness 14 of the non-conductive cover between each groove 3*a*-3*d* of the first face and each corresponding ridge 12*a*-12*d* of the second face may also be greater than half a wavelength.

In an alternative example, the face of the non-conductive cover facing away from the array of patch radiator elements may be flat.

As shown in the example of FIG. 1, the spacing between each ridge and each adjacent groove measured in a plane parallel to the first face of the ground plane may be the same as a spacing between adjacent patch radiator elements in a row of patch radiator elements. In an alternative arrangement, the spacing between each ridge and each adjacent groove may be an integer multiple of a spacing between adjacent patch radiator elements in a row of patch radiator elements. For example, the spacing between ridges and grooves may be twice or three times the spacing between rows of patch antenna elements.

As shown on FIGS. 1, 2 and 3, each row of patch radiator elements in the array of patch radiator elements may be aligned with a respective ridge or groove such that adjacent rows of patch radiator elements in the array are arranged such that one is aligned with a groove and the other is aligned with a ridge. This has been found to provide particularly effective reduction in distortion to a beam shape produced by the array of antenna elements.

As shown in FIG. 1, the arrangement of alternating parallel ridges and grooves on at least the first face of the non-conductive cover is substantially sinusoidal in a cross section in a plane perpendicular to the first face of the ground plane.

Figure 4:
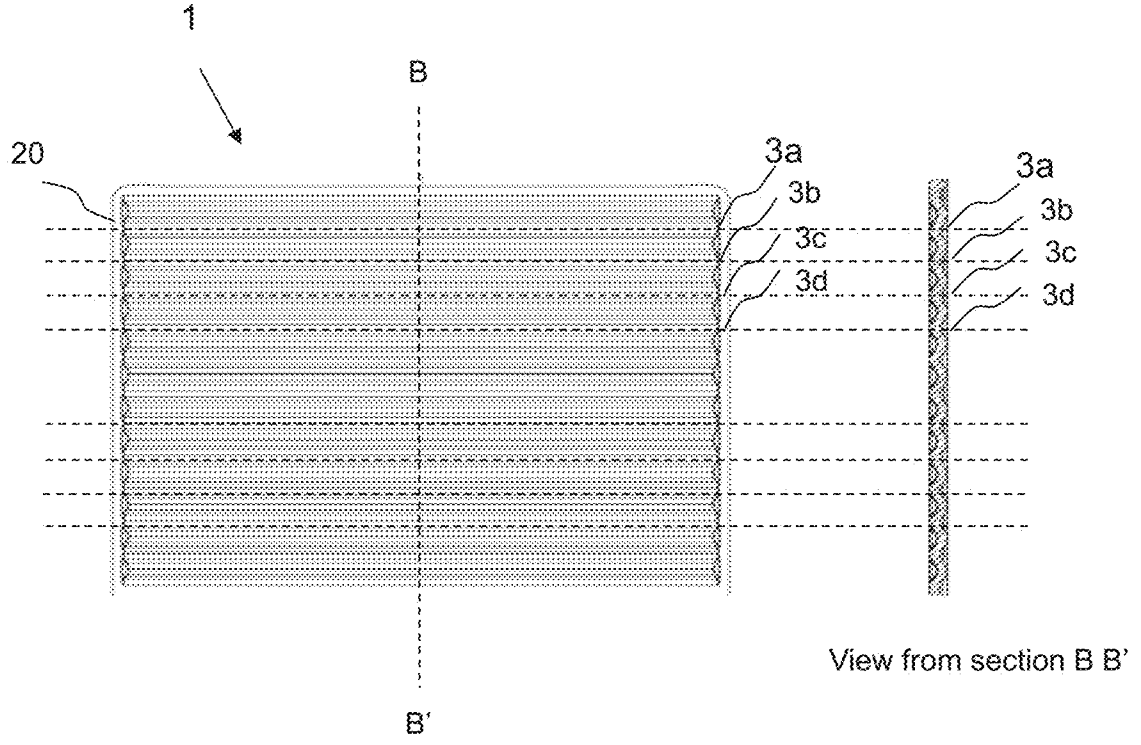
FIG. 4 illustrates a non-conductive cover for the array of antenna elements of FIG. 3 viewed from perpendicular to the plane of the array and in a perspective view from a cross-section in an embodiment of the invention.

FIG. 4 show a non-conductive cover 1 for the array of antenna elements of FIG. 3 viewed from perpendicular to the plane of the array and viewed from a cross-section B B'. In this example, the ridges and groves 3*a*, 3*b*, 3*c*, 3*d* extend across the part of the non-conductive cover above the array of patch radiator elements, through which radiation is expected to be transmitted and/or received. The non-conductive cover 1 may attached to a transceiver enclosure, for example by screws or other fixings, by a flange or support section 20 around the perimeter of the non-conductive cover and outside the region of the non-conductive cover through which radiation is intended to pass. The support section 20 is typically thicker than the region of the non-conductive cover through which radiation is intended to pass.

Figure 5:
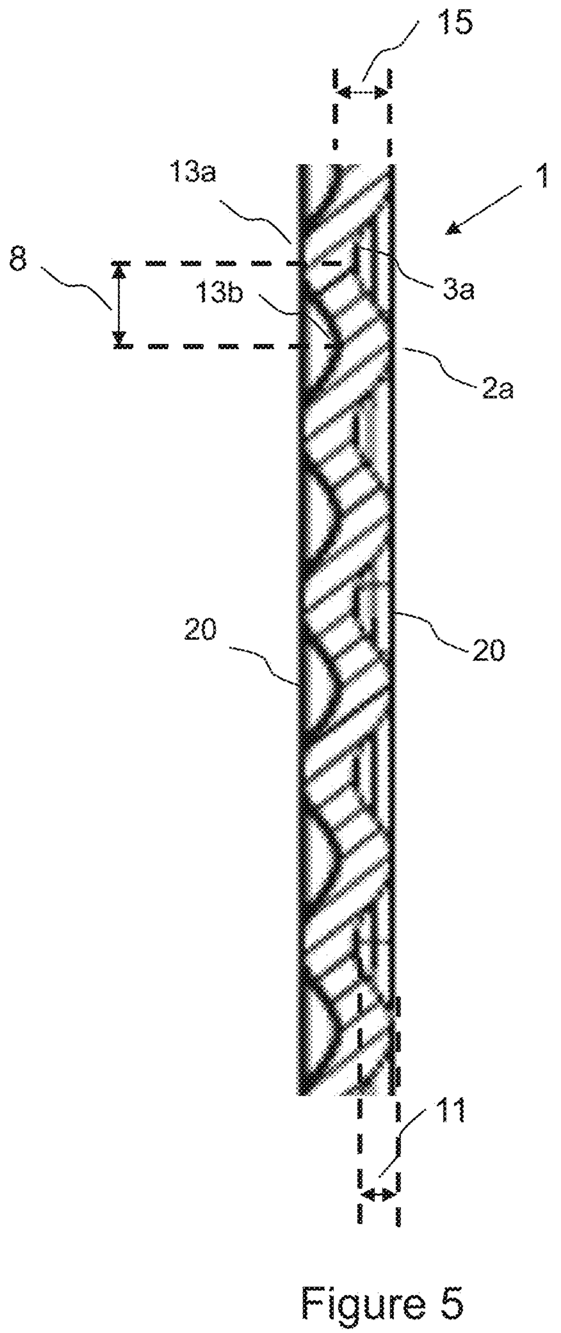
FIG. 5 shows an enlarged view of the perspective view from a cross-section of the non-conductive cover of FIG. 4.

FIG. 5 shows an enlarged view of the perspective view from the cross-section of the non-conductive cover of FIG. 4. In the illustrated example, the spacing 8 between a ridge 2*a* and a groove 3*a* is 0.7 wavelengths in air, and the spacing between the centres of adjacent patch radiator elements in a column of is also 0.7 wavelengths in air. In the example shown, the relative dielectric constant, that is to say relative permittivity, of the material of the non-conductive cover is approximately 3.3. In FIG. 5, the perspective view shows the cross-section through the non-conductive cover and also shows the flange or support section 20 at the edges of the non-conductive cover, seen in the distance, beyond the region through which radiation is intended to be transmitted/received. The ridges and grooves of the non-conductive cover 1 interface with air.

Figure 6:
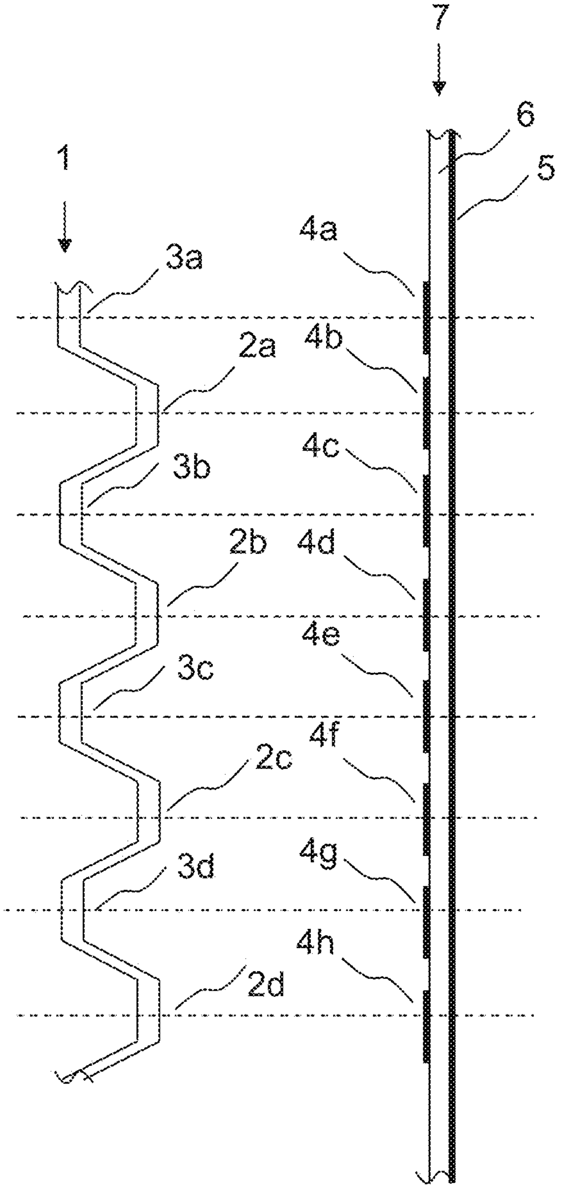
FIG. 6 shows an embodiment of the invention in which the non-conductive cover has a trapezoidal form.

FIG. 6 shows an embodiment of the present disclosure in which the non-conductive cover has a trapezoidal form. Each ridge 2*a*, 2*b*, 2*c*, 2*d* and each groove 3*a*, 3*b*, 3*c*, 3*d* may be a flat rectangular section of the respective face of the non-conductive cover 1. The array of patch radiator elements 4*a*-4*h* in this example is formed as etched copper sections on one side of printed circuit board 7, the other side being a ground plane 5. The dielectric material 6 may be a suitable dielectric material for use in radio frequency circuits.

In an embodiment, each column of patch radiator elements is configured to be disposed as a vertical array of elements fed by a respective feed network when in use, and each groove and each ridge is configured to be disposed horizontally when in use. The feed network may, for example, be an arrangement of microstrip lines and printed splitters/combiners arranged to feed a given polarisation of each patch radiator element in the column with a signal derived from a single input/output line. The input/output line may be connected to a radio transmit and/or receive chain for transmitting and/or receiving radio frequency signals. The patch radiator elements of each column are typically fed by the feed network with signals having appropriate relative signal phases to produce a narrow beam in elevation.

Each column of patch radiator elements may be configured to be fed with a different respective signal, for example for a beamformed or MIMO system.

The antenna array assembly may have an operating frequency greater than 10 GHZ, and in an example may have an operating frequency of substantially 28 GHz. The non-conductive cover may be composed of a material having a relative dielectric constant of 2-3.5, and for example may be composed of polycarbonate.

The above embodiments are to be understood as illustrative examples of the present disclosure. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

The invention claimed is:

1. An antenna array assembly, comprising:

a ground plane;

an array of patch radiator elements having a plurality of rows and a plurality of columns of patch radiator elements disposed in a plane parallel to a first face of the ground plane; and a non-conductive cover disposed in a generally parallel relationship to the ground plane such that the array of patch radiator elements is between the non-conductive cover and the ground plane, the non-conductive cover having a first face disposed towards the array of patch radiator elements and a second face disposed away from the array of patch radiator elements, wherein at least the first face of the non-conductive cover has an arrangement of alternating parallel ridges and grooves, in which, in a cross section in a plane perpendicular to the first face of the ground plane, the ridges extend towards the array of patch radiator elements and the grooves extend away from the array of patch radiator elements, wherein each row of patch radiator elements is disposed in a parallel relationship to each ridge, and wherein a perpendicular distance between each groove on the first face of the non-conductive cover and the array of patch radiator elements is greater by at least a quarter of a wavelength at an operating frequency of the antenna array assembly than a perpendicular distance between each ridge on the first face of the non-conductive cover and the array of patch radiator elements.

2. The antenna array assembly of claim 1, wherein the perpendicular distance between each groove on the first face of the non-conductive cover and the array of patch radiator elements is greater by between a quarter and a half of a wavelength in air at an operating frequency of the antenna array assembly than a perpendicular distance between each ridge on the first face of the non-conductive cover and the array of patch radiator elements.

3. The antenna array assembly of claim 2, wherein the perpendicular distance between each groove on the first face of the non-conductive cover and the array of patch radiator elements is greater by between 0.3 and 0.4 wavelengths in air at an operating frequency of the antenna array assembly than a perpendicular distance between each ridge on the first face of the non-conductive cover and the array of patch radiator elements.

4. The antenna array assembly of claim 1, wherein the second face of the non-conductive cover has an arrangement of alternating parallel ridges and grooves, each ridge on the second face overlying a corresponding groove on the first face.

5. The antenna array assembly of claim 4, wherein a thickness of the non-conductive cover between each ridge of the first face and each corresponding groove of the second face is greater than half a wavelength at an operating frequency of the antenna array assembly in a dielectric material of which the non-conductive cover is composed.

6. The antenna array assembly of claim 1, wherein a perpendicular distance between each ridge on the first face of the non-conductive cover and the array of patch radiator elements is between one and three wavelengths at an operating frequency of the antenna array assembly.

7. The antenna array assembly of claim 1, wherein a spacing between each ridge and each adjacent groove measured in a plane parallel to the first face of the ground plane is an integer multiple of a spacing between adjacent patch radiator elements in a column of patch radiator elements.

8. The antenna array assembly of claim 1, wherein a spacing between each ridge and each adjacent groove measured in a plane parallel to the first face of the ground plane is the same as a spacing between adjacent patch radiator elements in a column of patch radiator elements.

9. The antenna array assembly of claim 1, wherein each row of patch radiator elements in the array of patch radiator elements is aligned with a respective ridge or groove such that adjacent rows of patch radiator elements in the array are arranged such that one is aligned with a groove and the other is aligned with a ridge.

10. The antenna array assembly of claim 1, wherein the arrangement of alternating parallel ridges and grooves on at least the first face of the non-conductive cover is substantially sinusoidal in a cross section in a plane perpendicular to the first face of the ground plane.

11. The antenna array assembly of claim 1, wherein the arrangement of alternating parallel ridges and grooves on at least the first face of the non-conductive cover is such that each ridge and each groove is trapezoidal in a cross section in a plane perpendicular to the first face of the ground plane.

12. The antenna array assembly of claim 1, wherein the arrangement of alternating parallel ridges and grooves on at least the first face of the non-conductive cover is such that each ridge and each groove is triangular in a cross section in a plane perpendicular to the first face of the ground plane.

13. The antenna array assembly of claim 1, wherein each column of patch radiator elements is configured to be disposed as a vertical array of elements fed by a respective feed network when in use, and wherein each groove and each ridge is configured to be disposed horizontally when in use.

14. The antenna array of claim 13, wherein each column of patch radiator elements is configured to be fed with a different respective signal.

15. The antenna array assembly of claim 1, having an operating frequency greater than 10 GHz.

16. The antenna array assembly of claim 1, having an operating frequency of substantially 28 GHz.

17. The antenna array assembly of claim 1, wherein the non-conductive cover is composed of a material having a relative dielectric constant of 2-3.5.

18. The antenna array assembly of claim 1, wherein the non-conductive cover is composed of polycarbonate.

19. An antenna array assembly, comprising:

a ground plane;

an array of patch radiator elements having a plurality of rows and a plurality of columns of patch radiator elements disposed in a plane parallel to a first face of the ground plane; and a non-conductive cover disposed in a generally parallel relationship to the ground plane such that the array of patch radiator elements is between the non-conductive cover and the ground plane, the non-conductive cover having a first face disposed towards the array of patch radiator elements and a second face disposed away from the array of patch radiator elements, wherein at least the first face of the non-conductive cover has an arrangement of alternating parallel ridges and grooves, in which, in a cross section in a plane perpendicular to the first face of the ground plane, the ridges extend towards the array of patch radiator elements and the grooves extend away from the array of patch radiator elements, wherein each row of patch radiator elements is disposed in a parallel relationship to each ridge, and wherein each row of patch radiator elements in the array of patch radiator elements is aligned with a respective ridge or groove such that adjacent rows of patch radiator elements in the array are arranged such that one is aligned with a groove and the other is aligned with a ridge.

20. An antenna array assembly, comprising:

a ground plane;

an array of patch radiator elements having a plurality of rows and a plurality of columns of patch radiator elements disposed in a plane parallel to a first face of the ground plane; and a non-conductive cover disposed in a generally parallel relationship to the ground plane such that the array of patch radiator elements is between the non-conductive cover and the ground plane, the non-conductive cover having a first face disposed towards the array of patch radiator elements and a second face disposed away from the array of patch radiator elements, wherein at least the first face of the non-conductive cover has an arrangement of alternating parallel ridges and grooves, in which, in a cross section in a plane perpendicular to the first face of the ground plane, the ridges extend towards the array of patch radiator elements and the grooves extend away from the array of patch radiator elements, wherein each row of patch radiator elements is disposed in a parallel relationship to each ridge, and wherein each column of patch radiator elements is configured to be disposed as a vertical array of elements fed by a respective feed network when in use, and wherein each groove and each ridge is configured to be disposed horizontally when in use.

* * * * *